Nov. 17, 1964   R. A. SLOAN ETAL   3,157,422
HAND IMPLEMENT
Filed July 15, 1963

INVENTORS
RALPH A. SLOAN
RALPH E. ADDY
BY
ATTORNEY

United States Patent Office 3,157,422
Patented Nov. 17, 1964

3,157,422
HAND IMPLEMENT
Ralph A. Sloan, 636 42nd St., and Ralph E. Addy, 620
42nd St., both of Des Moines, Iowa
Filed July 15, 1963, Ser. No. 295,133
1 Claim. (Cl. 294—19)

This invention relates to a hand implement usable to pick objects from the ground and more specifically to a hand implement having a pair of spring biased fingers which are operable to grip and retain elongated objects such as sticks or twigs lying upon the ground.

It is the object of the invention to provide an improved hand implement having a pair of spring biased fingers which are spread apart upon being placed adjacent opposite sides of an elongated object so as to grip the object therebetween.

Another object of the invention is to provide a hand implement which can be operated with one hand of a person in a standing position to pick up sticks from the ground.

A further object of the invention is to provide a hand implement which is operable to successively pick up a plurality of elongated objects and retain the objects for lateral removal.

An additional object of the invention is to provide a durable and rugged hand implement for picking up objects from the surface of the ground which is economical and sturdy in construction and reliable and efficient in use.

The exact nature of the invention as well as other objects and advantages thereof will be readily apparent from the consideration of the following specification relating to the annexed drawing in which.

Figure 1:
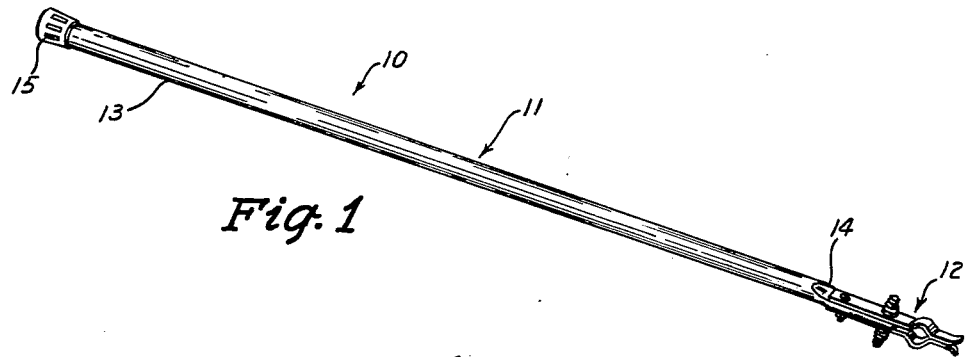
FIG. 1 is a perspective view of the hand implement of the invention.

Referring to the drawing, there is shown in FIG. 1 a hand implement 10 constructed according to the invention and having a handle 11 and a grip mechanism 12. The implement 10 is used by a person to pick up elongated objects such as small limbs, sticks, or twigs from the ground surface.

The handle 11 is an elongated tubular member formed from aluminum rod and has a length sufficient to engage the ground when the operating end 13 of the handle is held in the hand of a standing person. A cap 15 of resilient material such as rubber or plastic is positioned about the hand end section 13 and functions as a hand pad during use of the implement.

Figure 2:
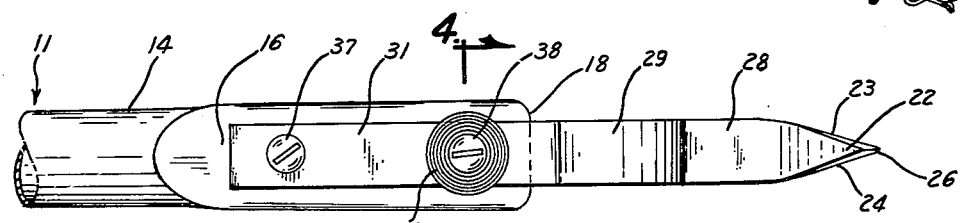
FIG. 2 is an enlarged plan view of the working end of the implement of FIG. 1.
Figure 3:
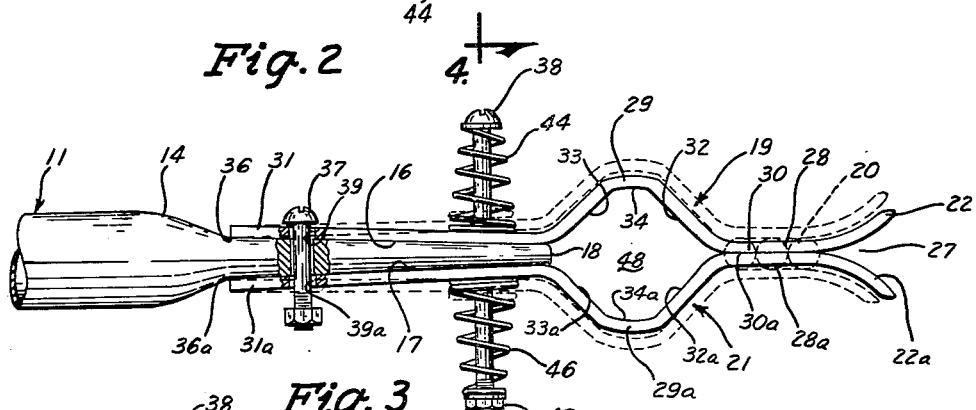
FIG. 3 is a side view of the working end of the implement with parts broken away to more clearly show its construction.

The handle has a working end section 14 which is best illustrated in FIGS. 2 and 3. This section 14 has a pair of opposite side surfaces 16 and 17 which are substantially flat and converge in a direction toward the end 18 of the section 14. The included angle between the flat surfaces 16 and 17 tapers from about between 7 to 10 degrees. As shown in FIG. 2, the work end section 14 has a substantially constant width which is substantially equal to the diameter of the handle 11 so that the terminating end 18 of the section 14 is flat and extends transversely of the handle.

Figures 4, 5:
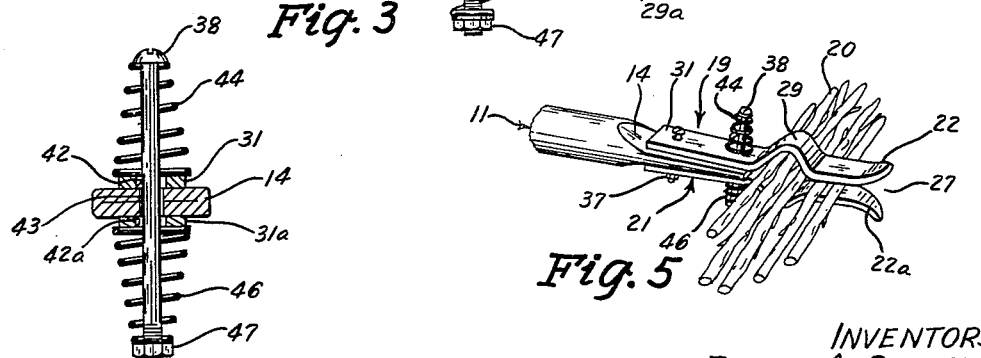
FIG. 4 is a sectional view taken along the line 4—4 of FIG. 2.
FIG. 5 is a perspective view of the working end of the implement holding a plurality of elongated objects.

The grip mechanism 12 comprises a pair of finger members 19 and 21 which are operable to pick up and retain elongated objects, such as the sticks 20 illustrated in FIG. 5. The finger members 19 and 21 are identical in construction and are formed from a metal strap. The following description is limited to the specific shape of the finger member 19 with corresponding sections of the finger member 21 being indicated with identical reference numbers having the suffix a.

The finger member 19 extends longitudinally of the handle 11 with a portion extended beyond the end 18 and terminating in a pointed lip 22. As shown in FIG. 2, the lip 22 has a pair of tapered knife edges 23 and 24 which intersect to form a sharp point 26. In use, the knife edges and sharp point permit the lip 22 to pierce the surface of the ground. As shown in FIG. 3, the lip 22 curves in an outward direction and forms with the lip 22a of the finger member 21 a converging throat 27 for guiding the elongated objects between the finger members 19 and 21.

From the lip 22 a flat grip section 28 extends toward the handle 11 and has an inner longitudinally extended surface 30 which is in abutting relationship with the adjacent inner surface 30a of the finger member 21. The abutting surfaces 30 and 30a lie in the longitudinal plane of the handle 11 along a line which bisects the included angle between the flat tapered surfaces 16 and 17. An object collecting section 29 connects the grip section 28 with a flat support section 31. The section 29 has an outwardly convex shape defined by substantially flat and outwardly directed converging walls 32 and 33 which are connected with an arcuate apex portion 34. The support section 31 terminates in a transverse edge 36.

The flat support sections 31 and 31a of the finger members 19 and 21, respectively, are positioned against the flat surfaces 16 and 17 of the work end section 14 and have transverse edges 36 and 36a which provide a pivotal support for the finger members 19 and 21 for a purpose to appear later. The support sections 31 and 31a extend in a longitudinal direction to a point adjacent the end 18 of the section 14 where they join with the object collecting sections 29 and 29a, respectively.

As shown in FIG. 3, the finger members 19 and 21 are attached to the work end section 14 by a pair of nut and bolt assemblies 37 and 38 which transversely project through the sections 31 and 31a and the end section 14. The nut and bolt assemblies 37 and 38 are longitudinally spaced from each other and function to maintain the fingers 19 and 21 in longitudinal alignment with the handle 11 and permit relative transverse movement between in the fingers and the section 14.

The nut and bolt assembly 37 extends through holes 39 and 39a in the support sections 31 and 31a of the fingers and a hole 41 in the end section 14. The holes 39 and 39a are slightly larger than the diameter of the bolt of the assembly 37. In order to permit pivotal movement of the finger members 19 and 21 about the transverse edges 36 and 36a, the distance between the head and nut of the assembly 37 has a length which is greater than the combined thickness of the fingers and the end section 14.

As shown in FIG. 4, the bolt of the assembly 38 extends transversely through holes 42 and 42a in the finger support sections 31 and 31a and through an aligned hole 43 in the end section 14. The bolt of the assembly 38 extends laterally outwardly from each finger and has a diameter slightly smaller than the diameter of the holes 42 and 42a permitting the finger members 19 and 21 to pivot on their respective transverse edges 36 and 36a.

Positioned about the lateral extensions of the assembly 38 are tapered coil or conical springs 44 and 46. The large diameter ends of the springs 44 and 46 abut the finger support sections 31 and 31a, respectively, and the small diameter ends of the springs 44 and 46 engage the head and nut 47, respectively, of the nut and bolt assembly 38. The nut and bolt assembly 38 being freely movable within the holes 42, 42a and 43 forms a movable connecting link between the small diameter ends of the springs 44 and 46. As shown in FIG. 3, the spring 44 biases the finger member 19 into engagement with the flat surface 16 of the end section 14 and the spring 46 biases the finger member 21 into engagement with the flat surface 17 of the end section 14. The compressive force of the springs 44 and 46 may be varied by adjusting the nut 47 of the nut and bolt assembly 38. When the support sections 31 and 31a of the finger members 19 and 21, respectively, are in engagement with the flat tapering surfaces 16 and 17, the longitudinally extended surfaces 30 and 30a of the grip sections 28 and 28a are in abutting relationship. In this position the grip section surfaces 30 and 30a lie in a plane which is common with the longitudinal axis of the handle 11.

In use, when it is desired to remove twigs or small limbs from a lawn or the like a person grips the hand end section 13 of the handle 11 holding the implement in a downward direction. The gripping mechanism 12 is placed over the limb so as to be disposed in the converging throat 27 formed by the lips 22 and 22a. The user then applies a downwardly directed pressure forcing the lips 22 and 22a over the limb 20 so that the limb is received between the grip sections 28 and 28a of the finger members.

As shown in the broken lines in FIG. 3, the twigs or small limbs 20 spread the finger members 19 and 21 against the biasing forces of the springs 44 and 46. During this spreading movement the finger members 19 and 21 fulcrum or pivot about the transverse edges 36 and 36a in the nature of a second class lever. The facing flat surfaces 30 and 30a of the grip sections 28 and 28a engage opposite portions of the limb 20 and thereby hold the limb between the finger members 19 and 21.

As shown in FIG. 5, when additional limbs are inserted between the finger members 19 and 21 the limbs successively move up into a pocket or cavity 48 defined by the outwardly convex-shaped object collecting sections 29 and 29a. The limbs 20 are retained in the cavity 48 by the substantially flat converging walls 32 and 33, 32a and 33a, and the arcuate apex portions 34 and 34a.

When the cavity 48 has been filled with twigs, the hand implement is turned end for end and the twigs are manually removed from the gripping mechanism 12 and deposited into a container for subsequent disposal into an incinerator or the like.

In summary, the hand implement of the invention has a pair of spring biased fingers which coact to grip limbs and retain limbs which are moved between the fingers.

The finger members 19 and 21 are positioned on opposite sides of the working end section 14 of the handle 11 and are biased toward each other and into engagement with the opposite sides by a pair of conical compression springs 44 and 46 which are positioned about a transversely extended nut and bolt assembly 38. A second transversely extended nut and bolt assembly 37 maintains the finger members 18 and 19 in longitudinal alignment with the handle 11 and permits the finger members to pivot about the transverse edges 36 and 36a, respectively, so that when the lips 22 and 22a are positioned over an elongated object the finger members 19 and 21 will spread apart and function as levers which fulcrum on the transverse edges 36 and 36a.

The invention has been described with respect to a preferred embodiment thereof and it is to be understood that it is not to be so limited since changes can be made therein which are within the full intended scope of this invention as defined by the appended claim.

We claim:

A hand implement usable to pick up elongated objects from the ground comprising:

(a) an elongated handle means having an end section with a pair of flat opposite surfaces, (b) at least one pair of finger members positioned adjacent said flat surfaces and extended beyond the end section of the handle means, (c) each finger member having a first flat portion engageable with a flat surface of the handle means and terminating in a transverse edge, a convex curved mid-portion, and a second portion having a flat longitudinally extended grip section terminating in an outwardly curved and pointed lip end, the grip sections of said second portions of said finger members normally positioned in abutting relationship, (d) means mounting each finger member on the end section of the handle means for pivotal movement relative to the transverse edge thereof, and (e) means operatively connected to each of said finger members for biasing the finger members toward each other.

References Cited by the Examiner

UNITED STATES PATENTS 1,851,681  3/32  Muzzy _____ 294—99 X
2,876,034  3/59  Bellisario _____ 294—106

SAMUEL F. COLEMAN, Acting Primary Examiner.

ERNEST A. FALLER, JR., Examiner.